United States Patent [19]

Smith, Jr.

[11] 4,194,444
[45] Mar. 25, 1980

[54] PARTICULATE SOLIDS

[75] Inventor: Horace L. Smith, Jr., Richmond, Va.

[73] Assignee: Smitherm Industries, Inc., Richmond, Va.

[21] Appl. No.: 628,907

[22] Filed: Nov. 5, 1975

[51] Int. Cl.$^2$ .................. F25D 17/02; F26F 17/12
[52] U.S. Cl. .................... 99/479; 34/57 A; 34/62; 62/374
[58] Field of Search .............. 99/479, 478, 477; 62/374, 57; 34/57 A, 57 D, 62, 10, 173; 198/803, 546, 952

[56] References Cited

U.S. PATENT DOCUMENTS

| | | | |
|---|---|---|---|
| 2,506,317 | 5/1950 | Rex | 62/57 |
| 3,009,689 | 11/1961 | Hinz | 34/173 |
| 3,028,681 | 4/1962 | Jorman et al. | 34/57 |
| 3,044,599 | 7/1967 | Gajda et al. | 198/803 |
| 3,189,460 | 6/1965 | Smith | 34/16 X |
| 3,329,506 | 7/1967 | Smith | 99/68 |
| 3,447,338 | 6/1969 | Smith | 62/57 X |
| 3,730,731 | 5/1973 | Smith | 426/467 |
| 3,795,058 | 3/1974 | Ganiaris | 34/57 D |
| 3,807,705 | 4/1974 | Humkey et al. | 259/95 |
| 3,925,024 | 12/1975 | Hollingsworth et al. | 34/57 A |

FOREIGN PATENT DOCUMENTS 642332  8/1950  United Kingdom ............ 99/478

Primary Examiner—John W. Shepperd
Attorney, Agent, or Firm—Le Blanc, Nolan, Shur & Nies

[57] ABSTRACT

Apparatus for processing particulate solids by fluid-solids contact which includes, in the illustrated embodiment, a reactor having a shell housing a rotatable, movable assembly or rotor for supporting a bed of solids and for displacing the solids from a first location where they are introduced into the reactor to a second location where they are discharged. As the solids are displaced, a process fluid is directed upwardly through the bed in a manner which causes the solids to circulate and come into intimate and uniform contact with the process fluid. Liquid can be sprayed into the reactor and into contact with the circulating solids.

8 Claims, 6 Drawing Figures

PARTICULATE SOLIDS

The present invention relates to apparatus for processing particulate solids and, more particularly, to novel, improved apparatus for uniformly and efficiently processing particulate solids by a continuous as opposed to batch-type process.

Apparatus according to the present invention can be employed to particular advantage in arresting the roast of and then further cooling roasted coffee; and the principles of the present invention will, accordingly, be developed primarily by reference to this application.

It is to be understood, however, that this is being done for the sake of clarity and convenience and is not intended to limit the scope of protection to which I consider myself entitled.

At the end of the roast, coffee beans have a temperature of several hundred degrees Fahrenheit. Therefore, unless the roasted beans are cooled rapidly, the residual heat in the beans will prolong the roast even though no external heat is applied. The result will be a heavy roast which is undesirable because of lower yields and lower soluble solids content and because coffee brewed from the beans will have a poor aroma and bitter taste.

In the past, arrest of the roast has typically been effected by dumping water on the roasted beans as they lie in the roaster or in a cooler as described in U.S. Pat. No. 2,278,473 issued Apr. 7, 1942, to Musher, for example. A major drawback of this method of quenching the roast is the lack of uniformity in the application of water to the beans. Consequently, the beans are not uniformly cooled and do not have uniform characteristics; and coffee brewed from them is of relatively poor quality.

Another disadvantage of this method of quenching a roast is that heat is inefficiently transferred from the beans to the cooling fluid. Cooling therefore proceeds slowly and with low efficiency.

Other methods of quenching the roast have heretofore been proposed. For example, U.S. Pat. Nos. 3,122,439 issued Feb. 25, 1964, to MacAlister et al and 2,857,683 issued Oct. 28, 1958, to Schytil suggest fluidizing the roasted coffee with a fluid which will extract heat from the beans. This technique also results in nonuniform cooling because the particles are virtually stagnant in a fluidized bed; and the fluidizing fluid increases in temperature as it passes upwardly through the bed. Consequently, the particles in the lower part of the bed will be cooled much more rapidly than those in the upper part.

A further disadvantage of the fluidized bed processes of which I am aware is that, because only one fluid is utilized, it must be a gas so that it will be capable of fluidizing the bed. Gases employed in practical volumes are incapable of arresting a roast with sufficient rapidity to prevent a heavy roast.

U.S. Pat. No. 2,716,936 issued Sept. 6, 1955, to Kopf suggests yet another process for cooling roasted coffee beans. In it the beans are cooled with a fluid which includes volatiles evolved from the beans during roasting. As discussed in my previously issued U.S. Pat. No. 3,345,180 dated Oct. 3, 1967, I have found that coffees such as Robustas can be substantially upgraded by driving off certain volatile substances during the roast and then removing these substances from the system so that they are not restored to the roasted beans. This benefit is completely lost in the Kopf process.

A further important disadvantage is that the volatiles Kopf utilizes as a cooling fluid exit from the roaster at a temperature of several hundred degrees Fahrenheit. To reduce the volume of volatiles necessary for cooling to a sufficiently low temperature to make them useful would be impractical.

My prior U.S. Pat. Nos. 3,332,780 issued July 25, 1967, and 3,447,338 issued June 3, 1969, disclose novel methods of and apparatus for cooling particulate solids which are free of the drawbacks discussed above. In the apparatus disclosed in them the roasted beans are simultaneously circulated by a fluid medium and sprayed with an inert quenching liquid until the roast is arrested. Cooling of the beans with the fluid medium is continued until the desired final temperature is reached.

One advantage of this cooling technique is that there is a rapid circulation or turnover of the beans being cooled. As a result, cooling of all of the beans starts virtually simultaneously and with all of the beans subjected to the same conditions; and there is uniformity of contact between the beans and the quenching liquid and the beans and the fluid cooling medium. Therefore, the beans are uniformly cooled which is important because uniformity of the roasted coffee is a major goal in the roasting of coffee.

Another important advantage of the technique disclosed in the foregoing patents is that, because of the more intimate contact between the beans and the fluid medium, the beans can be cooled to a temperature more closely approaching the ambient temperature of the fluid medium than has heretofore been possible in a cooling cycle of reasonable duration.

Also, the intimate contact of the fluid cooling medium and the quenching liquid with the beans increases the transfer of heat from the beans to the quenching liquid and fluid medium and therefore reduces the time required to quench the roast. The improved heat transfer characteristics also result in increased efficiency.

An additional, and important, advantage of treating solids in the manner just described is that there is only a small pressure drop through the bed so that power requirements are relatively low. This can result in substantial cost savings.

Yet another important advantage of cooling roasted coffee in accord with the principles developed in my issued patents result from the use of the same fluid medium to circulate the beans being cooled and to cool the beans. This simplifies the cooling apparatus and eliminates the energy input required to effect circulation, reducing the cost of building, operating, and maintaining the cooling apparatus.

Still another important advantage of my earlier inventions is that the liquid sprayed onto the beans is rapidly evaporated as long as the bean temperature is above 212° F. in the case of a water spray, for example. Such evaporation is accomplished by conversion of sensible heat in the beans into latent heat of vaporization, which rapidly reduces the bean temperature by extracting large amounts of sensible heat from the beans.

While it has many advantages as will be apparent from the foregoing, the apparatus disclosed in my U.S. Pat. Nos. 3,332,780 and 3,447,338 is only suited for batch-type operations. That is, the roasted beans are loaded into the reactor, treated, and discharged; and the cycle is then repeated.

I have now discovered that the advantages of this previously patented cooling apparatus can be retained but a continuous as opposed to batch-type operation and the advantages appurtenant thereto provided by adapting to cooling applications the novel roasters disclosed in my U.S. Pat. Nos. 3,615,668 issued Oct. 26, 1971; 3,724,909 issued Apr. 3, 1973; 3,730,731 issued May 1, 1973; and 3,823,662 issued July 16, 1974.

In these roasters a rotatable assembly displaces the beans from a first location where green beans are introduced into the roasting vessel to a second location where roasted beans are discharged. As the beans are displaced, they are roasted by a heated fluid, which will typically be an inert gas such as nitrogen. The roasting fluid is directed upwardly through the bed by apertures in stationary nozzle plates located in the lower reaches of the roasting vessel or reactor. This causes the beans being roasted to circulate in a pattern which produces uniform and intimate contact between the fluid and the beans and, as a consequence, efficient and uniform roasting of the beans.

For cooling applications these roasters are modified by supplying a cooling fluid to the reactor rather than a heated roasting fluid. Also, provision is made for introducing a liquid into the reactor in spray form to arrest or quench the roast. In addition, because cooling can generally be carried out without using an inert gas and at atmospheric pressure, novel structural modifications which simplify and consequently reduce the cost of the reactor are preferably made.

From a practical viewpoint the reactors disclosed in my U.S. Pat. Nos. 3,615,688; 3,724,909; 3,730,731; and 3,823,662 have the disadvantage that the velocity of the process fluid through the reactor must be closely controlled. This is important because, if the fluid velocity is too low, the circulation of the beans relied upon to obtain uniform treatment will not be obtained. On the other hand, if the fluid velocity is too high, beans can be carried from the reactor by the fluid. This not only wastes the beans but can adversely affect the operation of the apparatus in those applications in which the process fluid is recovered and recirculated, for example.

I have now discovered that the need for controlling the velocity of the fluid within close limits can be eliminated and the problem of beans being carried out of the reactor nevertheless avoided by using an appropriate deflector. This device is preferably incorporated in the movable assembly by which the beans are displaced during the roasting cycle.

As the beans circulate upwardly in apparatus according to the present invention the deflector directs them laterally and downwardly out of the mainstream of the upwardly flowing, process fluid. This insures that they are not carried out of the reactor by the fluid.

A not unrelated benefit of the deflector is that higher flow velocities of fluid can be used than would otherwise be the case. This is advantageous in that a greater scouring effect of the fluid on the beans can be obtained. The result is more efficient heat transfer, a shorter process cycle, and a corresponding increase in the capacity of the apparatus, a decided benefit from the economic viewpoint.

Coffee roasters (not coolers) with deflectors are illustrated and described in my earlier U.S. Pat. Nos. 3,189,460 issued June 15, 1965, and 3,285,157 issued Nov. 15, 1966. However, those deflectors do not function in the manner of the ones disclosed herein and discussed above. They are instead utilized to direct the beans being roasted from one roasting channel into a succeeding one or into a dwell zone from which they are reintroduced into a roasting channel.

Another feature of the novel coffee apparatus described herein is an improved construction of the movable assembly or rotor by which the beans are displaced from the location where they are introduced into the reactor to that where they are discharged at the end of the cooling cycle.

The movable assemblies described in my U.S. Pat. Nos. 3,615,668; 3,724,909; 3,730,731; and 3,823,662 have a vertical, cylindrical sleeve to which radial partitions are attached. The rotor cooperates with the shell of the reactor and with a fixed assembly composed of frustoconical inner and outer supports and an annular orifice plate to support the bed of beans. The radial partitions divide the bed into segments, which promotes uniform roasting, and effect the displacement of the beans during the roasting cycle.

I have now discovered that significant benefits can be derived by adding to a rotor as described above a cylindrical shroud or wall to which the outer edges of the radial partitions are attached. This novel modification strengthens the rotor and facilitates its construction. Also, dimensional tolerances are much less critical. For example, the need for maintaining the gaps between the vertical partitions of the rotors and the shell of the reactor small enough to keep the beans from passing from one segment of the bed to the next is eliminated as the outer sleeve, not the reactor shell, delineates the outer boundary of the bed.

Also, in the novel rotors disclosed herein, the lower part of the outer sleeve has a downwardly and inwardly inclined, frustoconical configuration; and a similarly configured, but outwardly inclined, cooperating member constitutes the lower end of the inner rotor sleeve. This eliminates the need for the frustoconical supports disclosed in my earlier patents, again simplifying and reducing the cost of the reactor.

In the novel rotor construction described above provision is preferably made for keeping solids from falling into the space between the rotor and the reactor shell as they enter the reactor. This is easily and inexpensively accomplished by dividing the outer rotor sleeve into a lower member and an upper member spaced inwardly from the lower one. A deflector is fixed to the reactor shell with its lower edge opposite a gap between the upper and lower, outer sleeve members. Any beans which fall outside the upper sleeve member impinge on the deflector and are directed by it into the interior of the movable assembly.

Another optional, but preferred, feature of the reactors disclosed herein is a simplified arrangement for supporting and rotating the movable assembly.

In my previously disclosed, continuous reactors the rotor is supported on a large, ringlike bearing. It is rotated by a shaft extending to the exterior of the reactor and carrying a pinion which meshes with an internal ring gear in the rotor.

I have now discovered that this relatively complex arrangement is unnecessary. The rotor can instead be supported by simple flanged bearings and coupled directly to the drive shaft, eliminating the ring gear and pinion.

The motor and other drive components can be mounted below the reactor shell and there drive-connected to the rotor drive shaft. This arrangement is simple and, also, permits the mounting of other process equipment above the reactor and the gravity feed of the solids to be processed into the reactor.

The novel reactors described herein are furthermore novel in that the quench liquid is introduced into the lower reaches of the reactor rather than into the upper part thereof as it is in the apparatus shown in my U.S. Pat. Nos. 3,332,780 and 3,447,338. My new arrangement has the important advantage that the liquid is rapidly and completely entrained in the process fluid, producing a faster and more uniform quench of the roast. Also, the system for supplying the quenching liquid is simplified.

From the foregoing it will be apparent to the reader that one important and primary object of the present invention resides in the provision of novel apparatus for processing particulate solids by fluid-solids contact in a continuous as opposed to batch-type manner.

A related, important and primary, object is the provision of novel, improved reactors in which roasted coffee beans can be cooled in a continuous as opposed to batch-type manner.

Yet other important objects reside in the provision of apparatus in accord with the preceding objects:

1. which makes the flow velocity of the process fluid through the roaster or reactor less critical than it has heretofore been;
2. which permits higher flow velocities of the fluid to be employed, thereby increasing the capacity of the reactor, for example;
3. which accomplishes the above-enumerated goals by deflecting the coffee beans or other solids being processed out of the mainstream of the process fluid so that the solids will not be carried out of the reactor by the fluid;
4. which accomplishes the goals identified in objects 1, 2, and 3 in a simple and economical manner;
5. which has a rotor or movable assembly of improved construction for displacing the solids being processed from one to the other of two locations in the reactor during the process cycle;
6. which, in conjunction with the preceding object, has a rotor of a construction which is strong and durable and eliminates the need for maintaining close tolerances between the movable assembly and the shell of the reactor;
7. which, in conjunction with object 5, simplifies the reactor by making it possible to eliminate certain of the components heretofore relied on to effect a circulation of the solids in the reactor during the process cycle;
8. which produces a faster and more uniform quench or arrest of the roast in applications such as those involving the cooling of roasted coffee beans;
9. which has a simplified arrangement for supporting and rotating the movable assembly; and
10. which has various combinations of the foregoing attributes.

Other important objects and features and additional advantages of my invention will become apparent from the appended claims and as the ensuing detailed description and discussion proceeds in conjunction with the accompanying drawing, in which:

Figure 1:
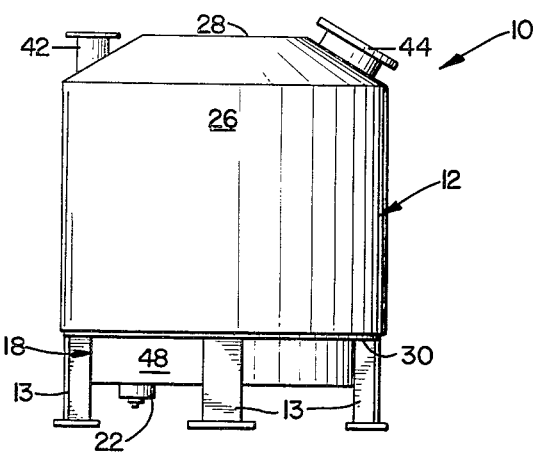
FIG. 1 is an elevation of a reactor constructed in accord with and embodying the principles of the present invention.
Figure 2:
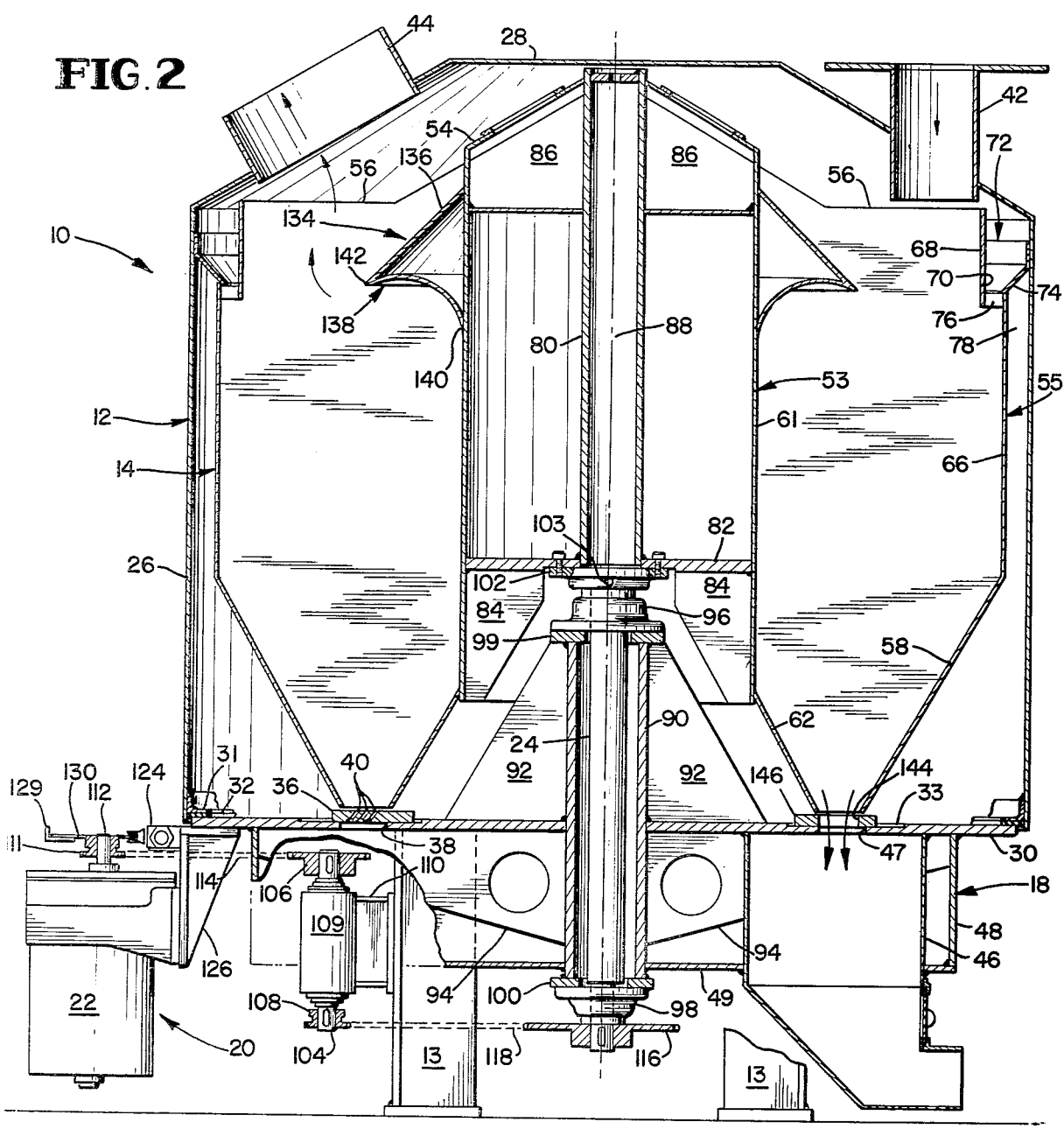
FIG. 2 is a vertical section through the reactor.

Referring now to FIGS. 1 and 2 of the drawing, the reactor 10 illustrated therein is constructed in accord with and embodies the principles of the present invention. This reactor may be employed in a wide variety of applications involving the contact of particulate solids and a process fluid. For the sake of clarity and convenience, the reactor will be described as a cooler for roasted coffee with the understanding that this is in no way intended to limit the scope of protection to which I consider myself entitled.

Reactor 10 includes a shell 12 supported on legs 13. The shell houses a rotatable, movable assembly or rotor 14 which supports a bed of beans 16 during the process cycle and displaces the beans from one location where hot, roasted beans are introduced into the bed to a second location where cooled beans are discharged. Also incorporated in reactor 10 are a boxlike, sheet metal plenum 18 from which air or other fluid is introduced into the reactor to effect a patterned circulation of the beans; a system 19 for spraying liquid such as water into the reactor to rapidly reduce the temperature of the beans and thereby arrest the roast (see FIG. 5); and a drive system 20 for rotating assembly 14 which includes a motor 22 and a rotor drive shaft 24.

Reactor shell 12 has a generally cylindrical side wall 26, a frustoconical top wall 28, and a flat bottom wall 30. The precise configuration of the shell is not critical and can be varied to meet the exigencies of a particular application.

The shell can be fabricated of any suitable structural material, again depending upon the particular application of the invention. Typically, the cooling of particulate solids such as coffee beans can be carried out at atmospheric pressure. In this case the top and side walls of the reactor shell can be fabricated of light sheet metal and the load bearing bottom wall 30 of plate stock.

The side and top walls are supported from bottom wall 30 by an annular, L-sectioned support 31 fixed to the lower edge of the side wall. An annular seal 32 between support 31 and bottom wall 30 keeps process fluid from leaking through the joint between the side and bottom walls.

Figure 3:
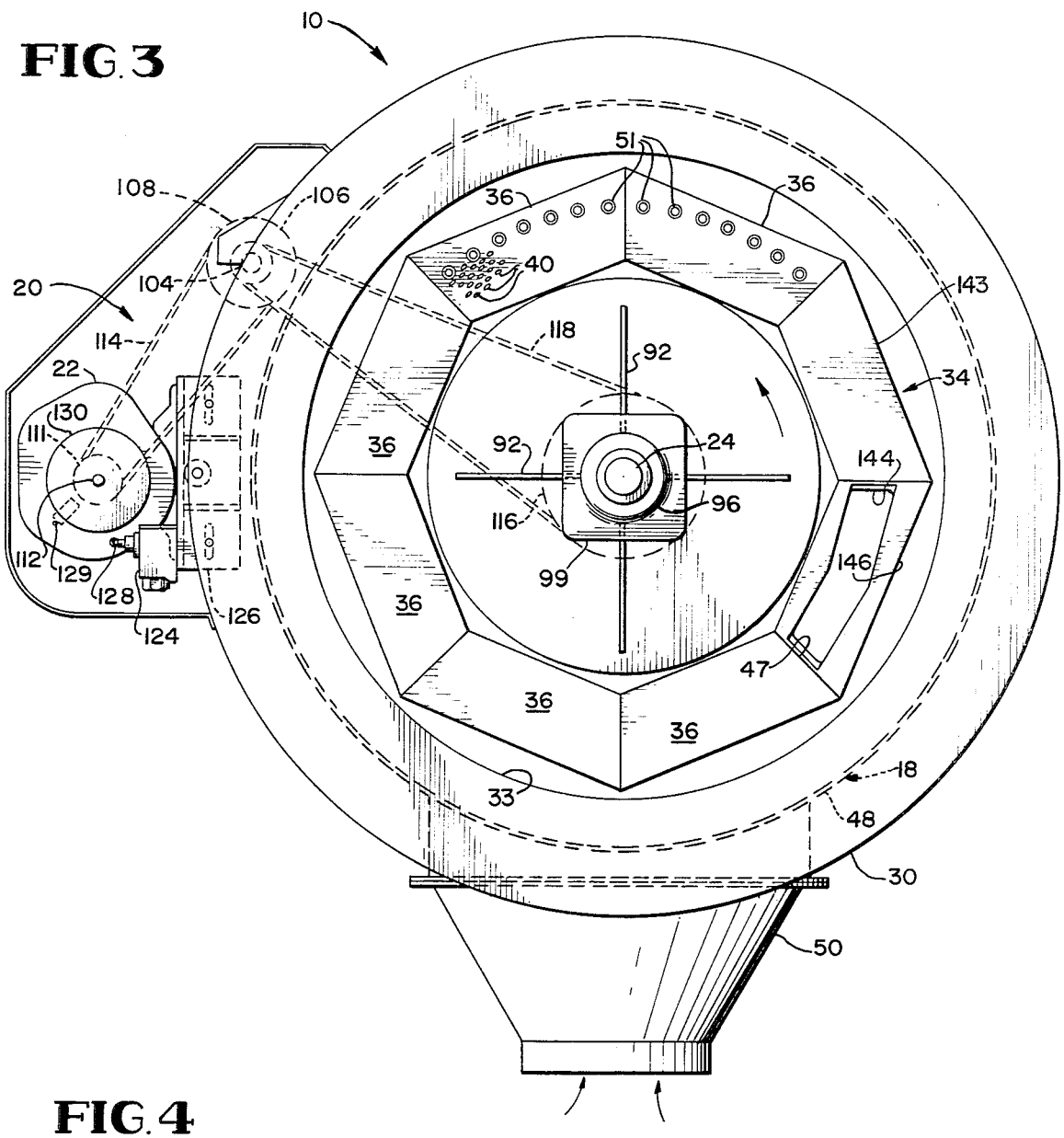
FIG. 3 is a plan view of the reactor with all but the lower wall of its outer shell and a rotor employed to displace the solids being treated removed to show other internal components.

Mounted on the bottom wall 30 of reactor shell 12 in a recess 33 is an annular array 34 of eight nozzle or orifice plates 36 (see FIGS. 2 and 3). Air (or other process fluid) supplied to plenum 18 for the purposes described above flows through openings 38 in bottom wall 30 and through orifices 40 in nozzle plates 36 into the bed of beans 16.

An inlet conduit 42 for hot, roasted beans and an outlet duct 44 for the process fluid communicate with the interior of reactor 10 through the top wall 28 of shell 12.

Cooled beans are discharged from the reactor via a discharge conduit 46. This conduit communicates with the interior of the reactor through a dump opening 47 in bottom wall 30.

Fluid supply plenum 18 is of simple construction. It includes a side wall 48 fixed to the bottom wall 30 of the reactor shell and a flat bottom wall 49 welded or otherwise fixed to the side wall.

The process fluid is supplied to the plenum through a duct 50 which communicates with the interior of the plenum through side wall 48 (see FIG. 3).

Figure 4:
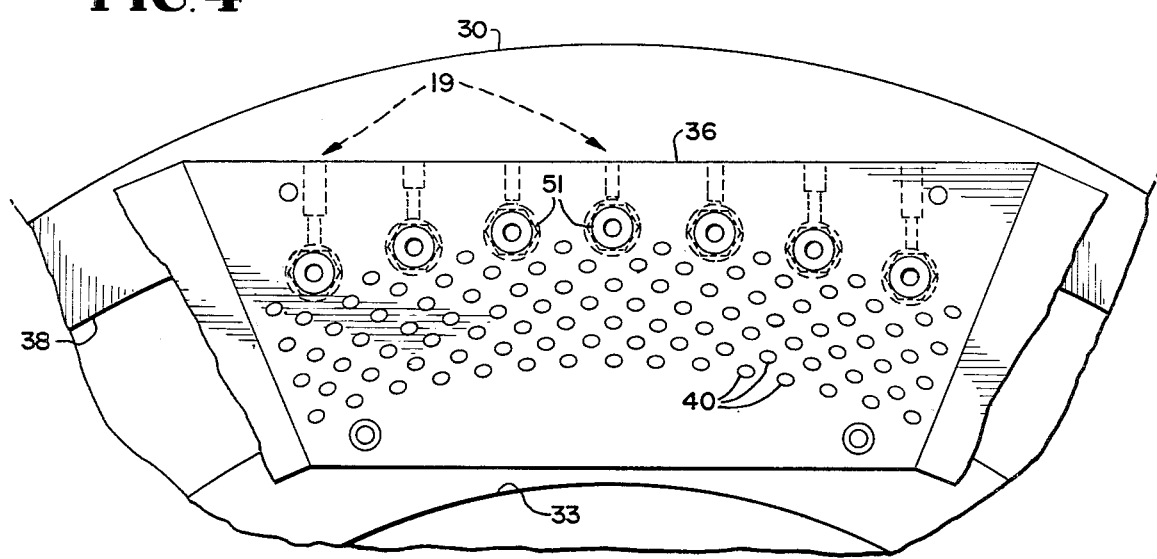
FIG. 4 is a fragment of FIG. 3 drawn to an enlarged scale to show the details of a nozzle or orifice plate or segment incorporated in the reactor.
Figure 5:
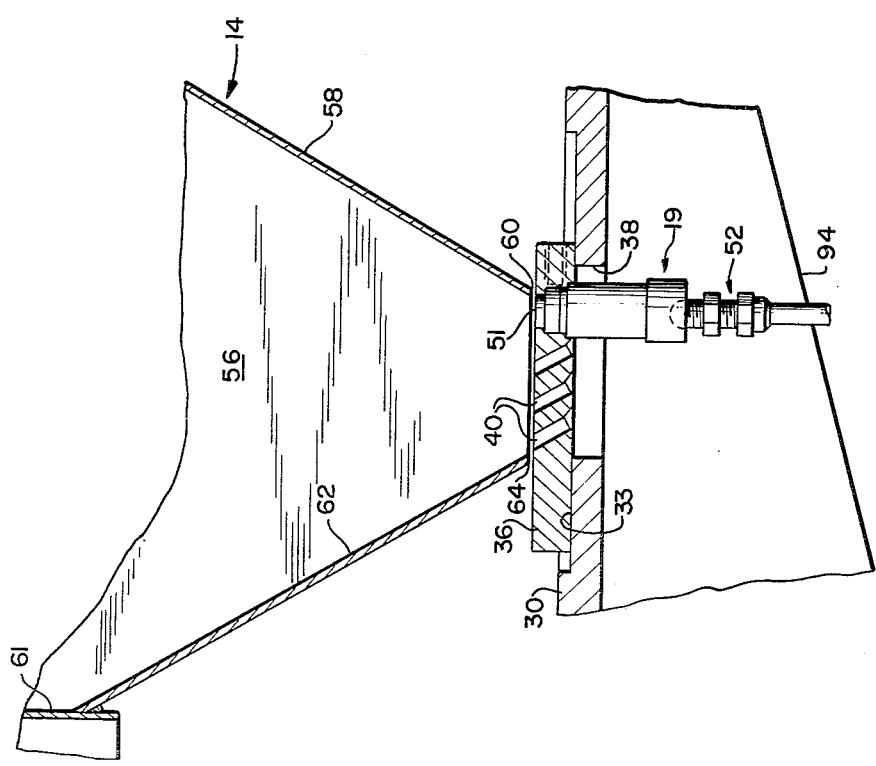
FIG. 5 is a section through the structure of FIG. 3 showing in fragmentary form a spray or nozzle system employed to introduce liquid into the reactor.

As best shown in FIGS. 3-5, the system 19 for spraying liquid into the lower reaches of reactor 10 to arrest the roast in coffee cooling applications and for comparable (and/or other) purposes in different applications includes spray nozzles 51. These nozzles are mounted in orifice plates 36 adjacent the outermost orifices 40. Typically, the tips of the nozzles will be made flush with the upper surfaces of the nozzle plates so that the particles of liquid will be efficiently and rapidly entrained by the process fluid exiting from the upper, outlet ends of the orifices.

In the illustrated embodiment of the invention seven nozzles are mounted in each of the first two orifice plates traversed by the roasted beans to arrest the roast as rapidly as possible. Both the number and location of the nozzles can of course be varied for other applications of the principles described herein.

Water, or other liquid, is supplied to those nozzles mounted in each orifice plate 36 from any suitable source through a manifold shown in fragmentary form in FIG. 5 and identified by reference character 52. The construction of the manifolds is not critical and not part of the present invention and will, accordingly, not be described in detail herein.

The rate at which liquid is supplied will of course vary depending upon the application, the size of the reactor, and other factors. In one reactor with a capacity of 3300 pounds of roasted coffee per hour, the rate is four gallons per hour.

The rotor 14 housed in shell 12 includes an inner, cylindrical sleeve 53 with a frustoconical cover 54 and an outer, cylindrical, sleeve or shroud 55 spaced from the side wall 26 of shell 12. These sleeves delineate the boundaries of bed 16.

Radially oriented partitions 56 extend between and are fixed to the inner and outer sleeves. In the illustrated reactor, there are eight such partitions. They divide the interior of the rotor and the bed 16 of solids therein into eight equal, radially extending segments to which the beans are confined to insure uniform treatment. The partitions also effect displacement of the beans around reactor 10 from inlet 42 to dump opening 47 as movable assembly 14 is angularly advanced or rotated.

Figure 6:
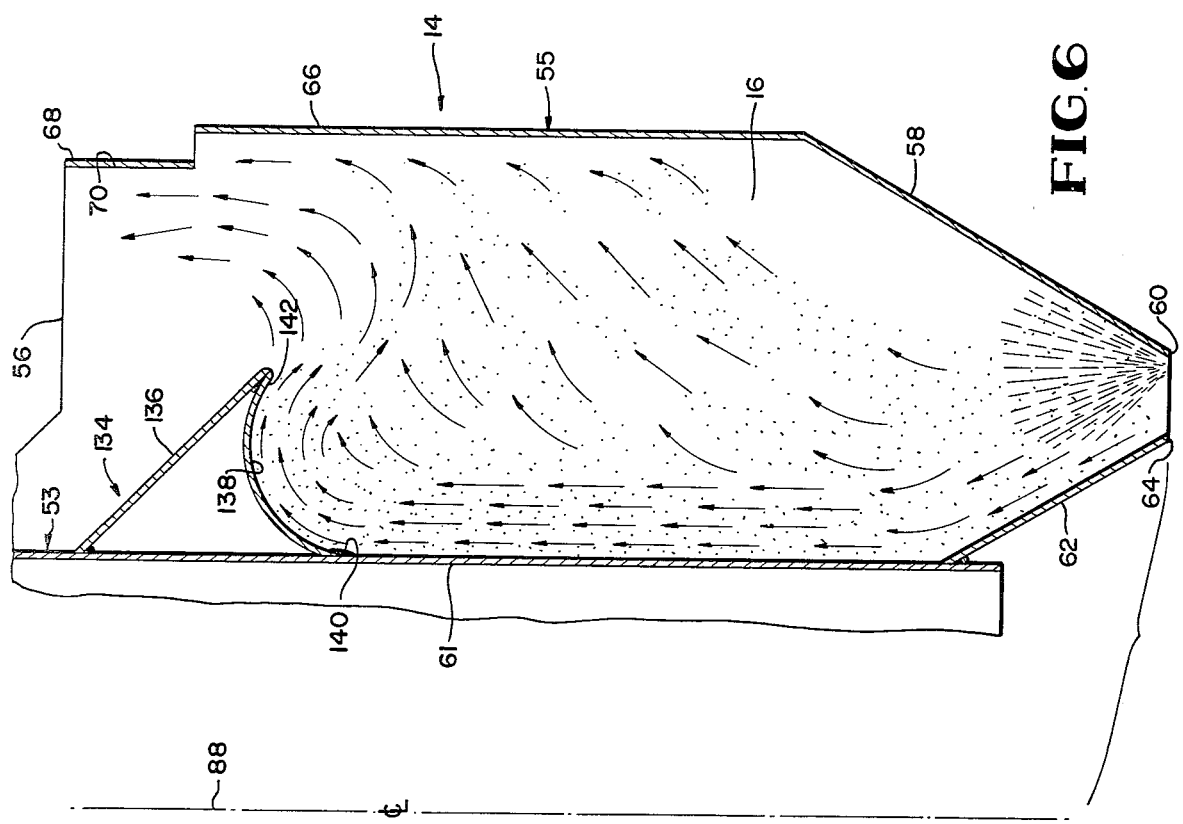
FIG. 6 is a fragment of FIG. 2 which shows the flow patterns of the process fluid and the spray from the nozzle system and the circulation pattern of the solids being processed.

The lower part 58 of outer sleeve 55 tapers inwardly and terminates in an edge 60 slightly spaced from or in rubbing contact with nozzle plates 36 adjacent the outermost orifices 40 (see FIGS. 5 and 6).

Inner sleeve 53 is composed of two members 61 and 62. Upper member 61 has a cylindrical configuration. The bottom edge 64 of lower member 62, which is frustoconical and tapers outwardly and downwardly, is also spaced slightly from or in rubbing contact with the nozzle plates but adjacent the innermost orifices rather than the outermost.

This combination of inner and outer, frustoconical or tapered members confines the upwardly flowing process fluid to bed 16 and also forms the bed into a configuration which makes the fluid capable of circulating the beans of which it is composed in the pattern shown in FIG. 6.

In the illustrated embodiment of my invention the outer sleeve 55 of movable assembly 14 is composed of a lower member 66 and a telescoped upper member 68 which is fitted into notches 70 in partitions 56. An annular, sheet metal particle deflector 72 is fixed to the side wall 26 of reactor shell 12 with an inwardly inclined, lower portion 74 thereof extending into the gap 76 between the telescoped members making up outer sleeve 55.

This novel arrangement keeps beans supplied to the reactor through inlet 42 from falling into the annular space 78 between rotor 14 and reactor shell 12. Any beans which fall outside upper member 68 drop onto deflector 72 and slide down its inclined part 74 and through gap 76 into the interior of the movable assembly.

Toward its lower end, inner sleeve 53 of the movable assembly is fixed to a hollow, vertical, capped tube or shaft 80 by an annular, load bearing, disclike support 82. Radially oriented, sheet metal stiffeners 84 fixed to the lower side of support 82 and to sleeve 53 increase the rigidity and strength of the sleeve and the connection between it and tube 80.

The upper end of sleeve 53 is also fixed to shaft 80. Radially extending, flanged brackets 86 connect the components.

Movable assembly 14 is supported in shell 12 for rotation about a vertical axis 88 on a tubular support or tube 90 extending through the bottom wall 30 of shell 12 and plenum 18 to the exterior of the reactor. Radially oriented brackets 92 fixed to support 90 and to the top of bottom wall 30 and radial brackets 94 in plenum 18 also fixed to support 90 and wall 30 rigidly support tube 90 from reactor shell 12.

Referring now specifically to FIG. 2, the drive shaft 24 for angularly advancing rotor 14 is rotatably supported in tube 90 for rotation about the same vertical axis 88 as the rotor by flanged bearings 96 and 98 at the upper and lower ends of the support. Bearing 96 is mounted on a plate 99 fixed to the upper end of support tube 90. Lower bearing 98 is attached to a plate 100 fixed to the lower end of the support.

Shaft 24 is drive-connected to rotor 14 through a coupling 102 bolted to lower rotor support 82 and a pin 103. The pin extends through the shaft and coupling to rotatably connect them together.

In addition to the drive shaft and motor 22, rotor drive system 20 includes a jackshaft 104 to which upper and lower pinions 106 and 108 are keyed. The jackshaft is rotatably supported in a housing 109 in turn supported from reactor leg 13 by bracket 110.

Motor 22 rotates upper pinion 106, jackshaft 104, and pinion 108 via a pinion 111 keyed to its output shaft 112 and a conventional roller chain 114 trained around pinions 106 and 111. Lower jackshaft pinion 108 is drive connected to a drive shaft pinion 116 through roller chain 118. Pinion 116 is keyed to and rotates the lower end of drive shaft 24. As drive shaft 24 is connected to rotor 14, energization of motor 22 will therefore result in the rotation of the movable assembly about axis 88.

Motor 22 is controlled by a microswitch 124 supported from lower, reactor shell wall 30 by the bracket 126 on which motor 22 is mounted. The switch has an actuator 128 operated by a cam 129 on an adjustable timing disc 130, which is rotated by motor output shaft 112. The motor control circuitry in which these components are incorporated may be of the character described in my U.S. Pat. Nos. 3,730,731 and 3,823,662 and will accordingly not be described herein.

In the operation of reactor 10, plenum 18 is supplied with process fluid through supply duct 50. From the plenum, the process fluid flows upwardly through nozzle plates 36, into and through the bed of beans 16 as shown in dotted lines in FIG. 6, and into outlet 44. This causes the beans in each of the segments of bed 16 to circulate in the vertical pattern shown in FIG. 6. As in my previously patented reactors having a similar circulation pattern, this results in efficient and uniform contact between the fluid and the beans, producing rapid and uniform cooling.

The process fluid also entrains and brings the liquid sprayed into the reactor through nozzles 51 into intimate and uniform contact with the hot beans in the initial stages of the cooling cycle as shown by the liquid flow pattern in FIG. 6. This is important both because it effects an efficient transfer of heat from the beans to the liquid and because it results in a uniform quench of the roast.

As indicated above, excess velocity of the process fluid has heretofore been a problem in reactors in which solids are circulated in a vertical pattern of the character shown in FIG. 6. In reactor 10 this problem is eliminated by a novel deflector 134 fixed to the inner sleeve 53 of rotor 14 at the upper end thereof. This deflector includes a frustoconical upper member 136 and an arcuately sectioned, lower member 138. The slope of lower member 138 changes from steeply and upwardly inclined at its inner edge 140 to a downward direction at its outer edge 142.

As shown in FIG. 6, the beans moving upwardly in the inner region of bed 16 for the most part continue upwardly until they reach the lower member 138 of deflector 134 where they are directed outwardly and downwardly out of the mainstream of the process fluid. Some of the beans will have so little energy after contacting the deflector that they will fall back into bed 16. Those beans having higher velocities will be directed against the outer sleeve 55 of the rotor and rebound into the bed.

It is important, in this regard, that there be sufficient distance between the deflector and the upper surface of the bed that the beans will be deflected against the outer sleeve rather than back against the bed. This keeps the faster moving beans from ricocheting off the bed and back into the stream of exiting fluid. The precise distance which must be left will of course depend upon the particular application of the invention. It can be readily ascertained by trial and error.

To complete the description of the manner in which reactor 10 operates, roasted beans are introduced into an empty segment of rotor 14 defined by two adjacent partitions 56 and located above an imperforate segment 143 of annular array 34 (see FIG. 3) through inlet 42. Rotor 14 is then angularly indexed by drive mechanism 20 to register the just-filled segment with the first of the nozzle plates 36, permitting the process fluid and spray to flow upwardly though the segment and quench the roast of the beans therein. The segment is then advanced stepwise to the second orifice plate 36 where the quench is completed, and then to the remaining orifice plates 36 where cooling continues.

Finally, the segment reaches dump opening 47. Here, the cooled, roasted beans drop through an opening 144 in an otherwise imperforate plate 146 incorporated in annular array 34 and through dump opening 47 into discharge conduit 46. From this conduit, the beans are transferred to a packaging or other operation.

It will be obvious to those skilled in the relevant arts that many modifications may be made in the embodiment described above to optimize its performance for paticular applications or for other purposes.

Furthermore, it will be readily apparent to such persons that the novel reactor disclosed herein can be used for applications other than those specifically mentioned including applications in which both a process fluid and a liquid are employed and one or both of them are heated.

Also, it is to be understood that, as examples, advantage can be taken of the deflector for keeping solids in the reactor and of the system for introducing liquid into the reactor independently of each other and of whatever mechanism might be provided for making the apparatus capable of carrying out a continuous as opposed to batch-type process. Conversely, advantage can be taken of the novel rotor support and/or drive systems, for example, without making use of the other novel features disclosed herein.

All such applications and modifications of the present invention and its various novel features are therefore intended to be covered by the appended claims unless expressly excluded therefrom.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed and desired to be secured by Letters Patent is:

1. Apparatus for processing particulate solids which includes a reactor comprising: a shell; means in said shell for supporting a bed of solids to be processed; means for so directing a flow of fluid upwardly though said reactor as to cause the solids to circulate in a vertical pattern therein; and means for introducing a liquid separately from said fluid and in finely divided form into the reactor at a level generally coincident with that of the flow directing means and into contact with the solids circulating in said reactor, the means for effecting a flow of process fluid upwardly through the reactor comprising a horizontally oriented means having fluid passages therethrough in the lower reaches of the reactor and the means for contacting the solids with a finely divided liquid comprising nozzles for spraying the liquid into the reactor adjacent said passages so that the particles of the liquid will be entrained in the process fluid and thereby brought into intimate contact with the particulate solids.

2. Apparatus as defined in claim 1, wherein the means for supporting the bed of solids includes a movable assembly which is rotatable about a vertical axis; wherein there are means for rotating the movable assembly about said vertical axis to thereby displace the solids being processed from a first location to a second location spaced around the interior of the shell from the first location and means for introducing solids to be processed into the reactor at said first location; wherein the means for effecting a flow of process fluid upwardly through the reactor comprises a series of sgements extending from said first location toward said second location; and wherein said spray nozzles are associated as aforesaid with the passages through at least the first of said segments and are supported from the segment or segments in which those passages are formed.

3. Apparatus for processing particulate solids which includes a reactor comprising: a shell; means in said shell for supporting a bed of solids to be processed; means for so directing a flow of fluid upwardly through said reactor shell as to cause the solids to circulate in a vertical pattern therein; and means for introducing a liquid in finely divided form into the reactor shell, independently of said fluid, at a level generally coincident with that of the flow directing means and into contact with the solids circulating in said reactor shell.

4. Apparatus for processing particulate solids which includes a reactor comprising: a shell; means in said shell comprising a movable assembly for supporting a bed of solids to be processed, said movable assembly comprising an inner wall means, an outer wall means, and vertical partitions extending radially between said inner and outer wall means; means supporting said movable assembly for rotation about a vertical axis; means for rotating said movable assembly to thereby displace solids in said bed from a first location to a second location spaced around the interior of the shell from said first location, said means comprising a drive shaft extending through said shell, means for rotating said drive shaft, and means fixing said movable assembly to said drive shaft for rotation therewith; means for introducing solids to be processed into the reactor at the first of said locations; means for removing processed solids from the reactor at the second of said locations; means for so effecting a flow of process fluid upwardly through said shell as to cause the solids to circulate upwardly in the inner region of the bed and thereby come into uniform and intimate contact with the process fluid as said solids are displaced from the first to the second of the aforesaid locations, said means comprising an annular array of orifice plates mounted in said shell beneath the movable assembly and between the inner and outer wall means of said movable assembly, there being passages for the process fluid through said orifice plates; and means for introducing a liquid into the reactor and into intimate contact with the solids being processed, said means comprising nozzles for spraying the liquid upwardly into the reactor adjacent the upper, outlet ends of the passages through at least that one of the orifice plates nearest the location at which the solids to be processed are introduced into the reactor.

5. Apparatus as defined in claim 4, together with deflector means at the upper end of the movable assembly inner wall means for directing the upwardly moving solids toward the outer region of the bed of solids and out of the mainstream of the upwardly flowing process fluid to thereby keep solids from being carried out of the reactor by the process fluid as they circulate upwardly therein, said deflector having a horizontally oriented, curved deflecting surface which changes in slope between a steeply and upwardly inclined inner edge and an outwardly and downwardly inclined outer edge.

6. Apparatus as defined in claim 4, wherein the means for supporting said movable assembly comprises said drive shaft; a tubular support surrounding said drive shaft, said support being located beneath and in axial alignment with said movable assembly and extending to the exterior of the reactor through the reactor shell; and bearings fixed in spaced relation to and rotatably supporting said drive shaft in said tubular support.

7. Apparatus for processing particulate solids which includes a reactor comprising: a shell, means in said shell for supporting a bed of solids to be processed; means for so effecting a flow of fluid upwardly through said reactor as to cause the solids to circulate in a vertical pattern therein; and means for introducing a liquid in finely divided form into the lower reaches of the reactor and into contact with the circulating solids; the means for effecting a flow of process fluid upwardly through the reactor comprising a horizontally oriented means having a series of segments with fluid passages therethrough, said means being located in the lower reaches of the reactor and extending from said first location toward said second location; the means for contacting the solids with a finely divided liquid comprising nozzles for spraying the liquid into the reactor adjacent said passages so that the particles of the liquid will be entrained in the process fluid and thereby brought into intimate contact with the particulate solids; the means for supporting the bed of solids including a movable assembly which is rotatable about a vertical axis and has an outer wall means which includes a first member and a second member spaced inwardly from and extending above the first member; said reactor also including deflector means for keeping solids from falling between said movable assembly and the reactor shell, said deflector means extending inwardly from said shell to said outer wall means to direct solids falling outside said movable assembly through the gap between the first and second members of the outer wall means into the interior of said movable assembly; and said reactor further including means for rotating the movable assembly about said vertical axis to thereby displace the solids being processed from a first location to a second location spaced around the interior of the shell from the first location and means for introducing solids to be processed into the reactor at said first location.

8. Apparatus for processing particulate solids which includes a reactor comprising: a shell; means in said shell comprising a movable assembly for supporting a bed of solids to be processed, said movable assembly comprising an inner wall means, an outer wall means, and vertical partitions extending radially between said inner and outer wall means; means supporting said movable assembly for rotation about a vertical axis; means for rotating said movable assembly to thereby displace solids in said bed from a first location to a second location spaced around the interior of the shell from said first location, said means comprising a drive shaft extending through said shell, means for rotating said drive shaft, and means fixing said movable assembly to said drive shaft for rotation therewith; means for introducing solids to be processed into the reactor at the first of said locations; means for removing processed solids from the reactor at the second of said locations; means for so effecting a flow of process fluid upwardly through said shell as to cause the solids to circulate upwardly in the inner region of the bed and thereby come into uniform and intimate contact with the process fluid as said solids are displaced from the first to the second of the aforesaid locations, said means comprising an annular array of orifice plates mounted in said shell beneath the movable assembly and between the inner and outer wall means of said movable assembly, there being passages for the process fluid through said orifice plates; means for introducing a liquid into the reactor and into intimate contact with the solids being processed, said means comprising nozzles for spraying the liquid upwardly into the reactor adjacent the upper, outlet ends of the passages through at least that one of the orifice plates nearest the location at which the solids to be processed are introduced into the reactor; and deflector means for keeping solids from falling between said movable assembly and said shell as said solids are introduced into the reactor, the outer wall means of said movable assembly having a first member and a second member spaced inwardly from and extending upwardly beyond the first member, and said deflector means comprising a deflector extending inwardly from said shell to said outer wall means to direct solids falling outside said movable assembly through the gap between the first and second members of the outer wall means into the interior of said movable assembly.

* * * * *